United States Patent [19]

Greenaway

[11] 4,250,393
[45] Feb. 10, 1981

[54] PHOTOELECTRIC APPARATUS FOR DETECTING ALTERED MARKINGS

[75] Inventor: David L. Greenaway, Oberwil, Switzerland

[73] Assignee: LGZ Landis & Gyr Zug AG, Zug, Switzerland

[21] Appl. No.: 8,427

[22] Filed: Jan. 31, 1979

[30] Foreign Application Priority Data

Mar. 20, 1978 [CH] Switzerland .......... 2995/78

[51] Int. Cl.³ .................................. G06K 7/10
[52] U.S. Cl. ............................ 250/566; 356/71
[58] Field of Search ............. 356/71, 359, 399, 400, 356/401, 445, 446, 448; 250/566, 216, 237 G, 550, 555, 556, 562, 571, 572

[56] References Cited

U.S. PATENT DOCUMENTS

| 3,809,478 | 5/1974 | Talbot | 356/71 |
| 3,879,131 | 4/1975 | Cuthbert et al. | 250/572 |
| 4,030,835 | 6/1977 | Firester et al. | 250/550 |

Primary Examiner—David C. Nelms

[57] ABSTRACT

An optical reading apparatus is described for reading documents which contain information in the form of optical markings which deflect a reading beam coming from a light source in at least one given direction of deflection. A first light sensor detects a deflected partial beam. A second light sensor, the optical axis of which lies in a given direction of deflection, is only receptive to those light rays deflected at the document which lie outside a first cone and inside a second cone which is coaxial with the second light sensor. A comparator compares the electrical signals of both light sensors. Altered markings, which cause additional dispersion of the reading beam, can be reliably distinguished from the unaltered markings.

8 Claims, 6 Drawing Figures

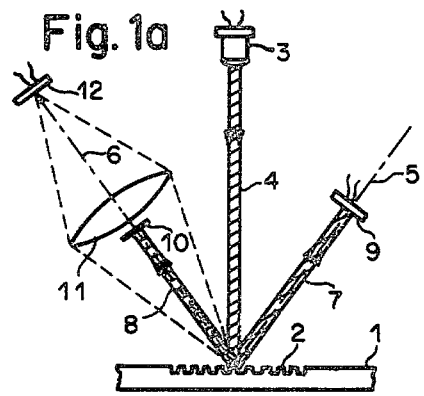
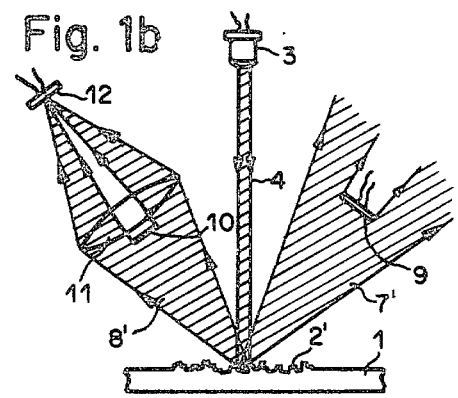
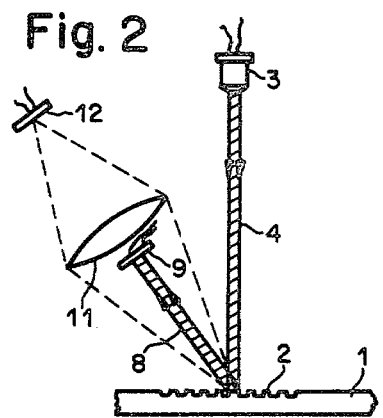
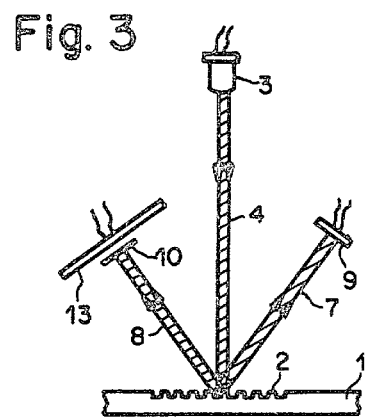
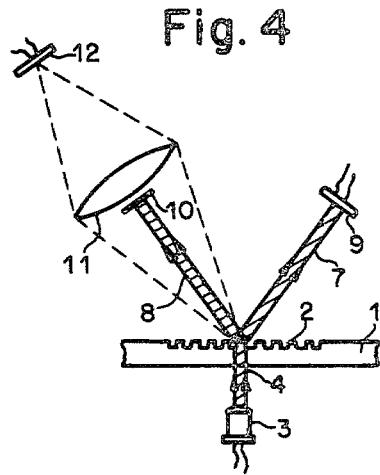
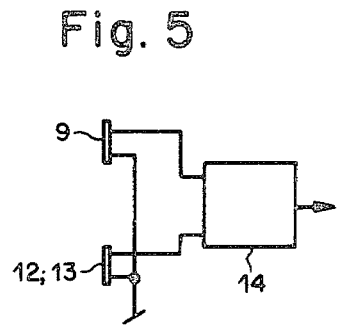

PHOTOELECTRIC APPARATUS FOR DETECTING ALTERED MARKINGS

This invention relates to optical reading apparatus for documents containing information in the form of optical markings.

A known reading apparatus (Swiss Pat. No. 589,897) of this kind is used to read out pieces of information about genuineness, which are stored in the form of diffraction gratings in a document. Light sensors are disposed in positions corresponding to at least two different diffraction orders of the diffraction grating. A decision logic means transmits a signal of genuineness when the energy proportions are in a predetermined relationship to one another in these diffraction orders.

It has also been proposed (Swiss Pat. No. 604,279 and the corresponding U.S. Pat. No. 4,163,570) to feed optical markings in the form of a first relief structure together with a resilient stress area into a thermoplastic information carrier of a document in such a way that the resilient stress area is transformed into a second relief structure by the action of heat, whereby the second relief structure is superimposed on the first relief structure and causes incident light to be dispersed diffusely. This enables optical markings to be obliterated or altered using minimal energy, in such a way that these markings can be distinguished from the unaltered markings by an optical reading apparatus. The purpose of obliterating or altering individual markings is to feed coded information into the document or, if the markings represent units of value of a prepaid money substitute means, to devalue the money substitute means step-by-step.

According to the present invention there is provided an optical reading apparatus for documents containing information in the form of optical markings which deflect a reading beam from a light source in at least one given direction of deflection, the apparatus comprising a light source, a first light sensor the optical axis of which lies in said given direction of deflection, a second light sensor the optical axis of which also lies in said given direction of deflection, and a comparator for comparing the respective electrical signals developed by said light sensors, the second light sensor being receptive only to those light rays deflected at the document which lie outside a first cone and inside a second cone, which cones are both coaxial with the optical axis of said second light sensor.

Embodiments of the invention can thus provide an optical reading apparatus which enables altered markings to be distinguished reliably and with a high signal-to-noise ratio from unaltered markings.

The invention will now be described by way of example with reference to the accompanying drawing, in which:

FIGS. 1a and 1b are diagrammatic views of a first embodiment of the optical part of a reading apparatus according to the invention;

FIGS. 2 to 4 similarly show respective further embodiments; and

FIG. 5 shows a comparator diagrammatically.

Referring to FIG. 1, a document 1 which is made of thermoplastic material and which may be an identity card, a credit card, a travel ticket, a check, an admission card, or a prepaid money substitute means which can be devalued step-by-step, etc., has a plurality of optical markings 2, although for the sake of simplicity only one of the markings 2 is shown in FIG. 1a.

The markings 2 are produced during manufacture of the document 1 by embossing a relief structure in the surface of the document 1, which surface was previously matt and which caused diffuse dispersion. This gives rise to a resilient stress area in the thermoplastic material of the document 1. Coded information is then fed into the document 1 by subjecting selected markings 2 to localized heat action, whereby the resilient stress area relaxes in the region of localized heating and the original matt surface becomes visible once more, but without the embossed relief structure disappearing. FIG. 1b shows a marking 2' altered by such local heat action, whereby the surface structure of the marking 2' corresponds to the superimposition of the original matt surface and the relief structure of the marking 2.

The relief structure of the marking 2 is of such a kind that it deflects an incident light ray in at least one given direction by means of diffraction, refraction or reflection. It can, therefore, be for example a hologram, a diffraction grating, a kinoform, etc. In FIG. 1a, the marking 2 is a reflecting phase diffraction grating, which splits up a reading beam 4 coming from a light source 3, and preferably falling vertically onto the document 1, into directions corresponding to the individual diffraction orders of the phase diffraction grating. The phase diffraction grating is advantageously of the kind in which the main proportion of the energy of the reading beam 4 is deflected into the first diffraction order 5 and the conjugate first diffraction order 6. As a result, the reading beam 4 is substantially split, as can be seen from FIG. 1a, by the marking 2 into a partial beam 7 of the first diffraction order 5 and a partial beam 8 of the conjugate first diffraction order 6.

The partial beam 7 falls onto a light sensor 9, the optical axis of which lies in the first diffraction order 5, and the partial beam 8 falls onto a mask 10, shaped like a circular disc and disposed in the conjugate first diffraction order 6. On the reverse side of the mask 10 remote from the document 1 there are disposed a lens 11 and a light sensor 12, the optical axes of which are aligned with the conjugate first diffraction order 6. The light sensor 12 is not illuminated when the marking 12 is optically scanned, since it is shielded from the partial beam 8 by the mask 10. It can easily be seen that only those rays of the reading beam 4 deflected at the document 1 which lie outside a first cone limited by the mask 10 and inside a second cone limited by the lens 11 and coaxial with the light sensor 12 can reach the light sensor 12.

During optical scanning of the altered marking 2', the reading beam 4 shown in FIG. 1b is split at the marking 2' into a divergent partial beam 7' and a divergent partial beam 8'. The partial beam 8' is largely picked up by the light sensor 12, while in contrast only a small proportion of the partial beam 7' falls onto the light sensor 9.

FIG. 2 shows a variation which differs from the embodiment in FIG. 1 in that the light sensor 9 acts as a mask and on the one hand detects the partial beam 8, while on the other hand shielding the light sensor 12 from the partial beam 8. This arrangement can be advantageous for reasons of space and also particularly if the marking 2 is of such a type that it does not split up the reading beam 4 into several partial beams but deflects it in a single direction.

In the embodiment of FIG. 3, a light sensor 13 is disposed behind the aperture 10, the sensor 13 having a circular detection surface which is large in comparison to light sensor 9 and the aperture 10, so that the lens 11 of the above embodiments may be omitted. The aperture 10 may also be omitted if the detection surface of the light sensor 13 is annular in shape.

In the embodiment of FIG. 4, the document 1 is read by transmission. In this case the document 1 is transparent to the reading beam 4 and the light source 3 is disposed on the side of the document 1 opposite to the light sensors 9 and 12.

The described embodiments permit a very reliable logic decision in that the electrical signal of the light sensor 9 is compared with that of the light sensors 12 and 13, shown in FIG. 5, in a comparator 14. The comparator 14 can, for example, form the difference or the quotient from the electrical signals of the light sensors 9 and 12 or 13. The quotient is, for example, much larger or much smaller than unity depending upon whether the reading beam 4 falls onto a marking 2 or onto an altered marking 2'. Naturally, the absolute values of these signals can also be tested in order to compare the electrical signals of the light sensors 9 and 12 or 13.

The described embodiments are also suitable for reading documents the markings 2 of which are not formed by a relief structure but are, for example, amplitude diffraction gratings and the like, which deflect the reading beam 4 in at least one given direction, the obliterated or altered markings 2' only also causing additional dispersion of the reading beam.

What I claim is:

1. An optical reading system comprising:
    a document including an information carrier having information recorded thereon in the form of first and second types of optical markings,
        said first type optical marking comprising a first relief structure which deflects a reading light beam in at least one specific direction,
        said second type optical markings comprising the first relief structure and a superimposed second relief structure which causes the reading light beam to be dispersed; and
    apparatus for distinguishing between said first and second optical markings comprising:
        a light source providing a light beam directed toward said document,
        a first light sensor located on an optical axis to receive light within a cone including the light deflected from said first relief structure in said specific direction,
        a second light sensor located on an optical axis to receive light outside the cone of light deflected from said first relief structure in said specific direction to thereby detect said dispersed light from said second relief structure, and
        a comparator coupled to said first and second sensors for comparing the respective electrical signals therefrom and to indicate whether an optical marking being examined is of said first or second type.

2. Apparatus according to claim 1 wherein a lens and at least one mask are located between said second light sensor and said document, said mask being positioned to shield said second light sensor from light deflected from said first relief structure.

3. Apparatus according to claim 2 wherein said mask is formed by said first light sensor.

4. Apparatus according to claim 1 wherein said second light sensor has a large detection surface in comparison with said first light sensor.

5. Apparatus according to claim 1, suitable for documents in which said optical markings are diffraction gratings, wherein said first and second light sensors are disposed to receive light diffracted into that diffraction order of the diffraction grating into which the main proportion of the energy of the reading beam is diffracted.

6. Apparatus according to claim 2, suitable for documents in which said optical markings are diffraction gratings, wherein said first and second light sensors are disposed to receive light diffracted into that diffraction order of the diffraction grating into which the main proportion of the energy of the reading beam is diffracted.

7. Apparatus according to claim 3, suitable for documents in which said optical markings are diffraction gratings, wherein said first and second light sensors are disposed to receive light diffracted into that diffraction order of the diffraction grating into which the main proportion of the energy of the reading beam is diffracted.

8. Apparatus according to claim 4, suitable for documents in which said optical markings are diffraction gratings, wherein said first and second light sensors are disposed to receive light diffracted into that diffraction order of the diffraction grating into which the main proportion of the energy of the reading beam is diffracted.

* * * * *